Feb. 27, 1945. E. RUSKA ET AL 2,370,373
ELECTRONIC MICROSCOPE
Filed Feb. 28, 1940
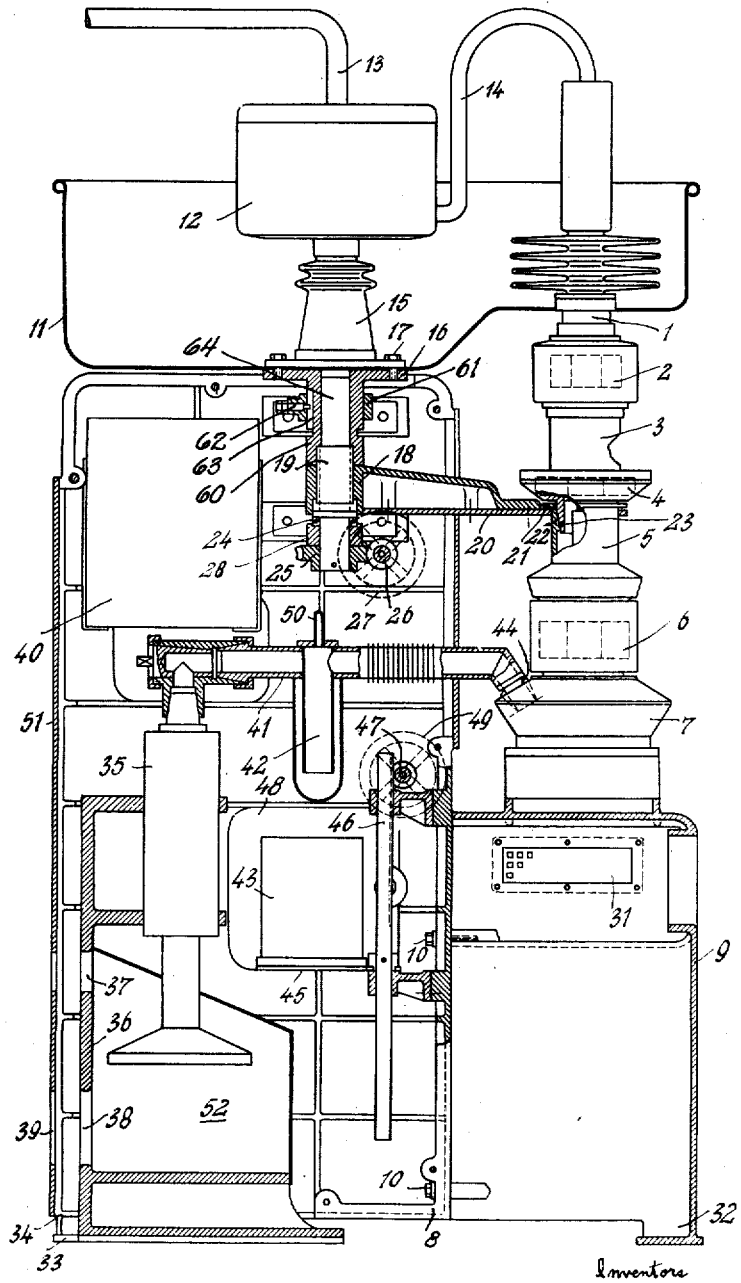

Patented Feb. 27, 1945

2,370,373

UNITED STATES PATENT OFFICE 2,370,373

ELECTRONIC MICROSCOPE

Ernst Ruska and Hans Schuchmann, Berlin-Spandau, Helmut Ruska, Berlin-Nikolassee, and Heinz Otto Müller, Berlin-Spandau, Germany; vested in the Alien Property Custodian Application February 28, 1940, Serial No. 321,239
In Germany January 17, 1939

6 Claims. (Cl. 250—49.5)

This invention relates to electronic microscopes, and more particularly to complete microscope systems including, besides the electron microscope proper, the auxiliary devices necessary for the operation of the microscope.

Such microscope systems comprise a large number of individual parts, such as, a vacuum pump with a cooling trap, a vacuum testing device and various electric control apparatus. These individual parts of the electronic microscope have hitherto been separately mounted so that the known systems represent complex plants rather than unitary apparatus. The microscopes proper as a rule also consist of a considerable number of individual parts such as a radiating apparatus for emitting an electron beam, an electron-optical condenser coil, magnifying lenses, an object holder, a vacuum vessel and the like. Occasionally it is necessary to inspect the individual apparatus or to remove them and replace them by new ones. This requires a rather difficult dismounting in the known microscope constructions.

An object of the present invention is to simplify the total construction of an electronic microscope system so as to integrate the various auxiliary devices and the microscope proper into a single unitary apparatus. Another object, in conjunction with the foregoing, is to facilitate the operation and control of such a unitary system. An object, further, is to design the microscope system in such a manner that the various devices composing the system are individually accessible in order to easily inspect or replace them if necessary. An object also is to provide mechanisms for moving some of the devices out of and into the operative position for dismounting and inspecting purposes.

According to the present invention, the auxiliary devices such as the vacuum pump, the vacuum testing apparatus, the cooling trap and their accessories, as well as the electric control devices, are mounted within a hollow, container or cabinet-like structure which forms a support for the electron microscope proper. In arrangements in which vertical electronic microscopes are employed, the hollow structure serving as a support for the microscope is preferably provided with a horizontal table surface for the lower part of the electronic microscope. In this case it is advisable to place those electric control devices, which are to be observed or manipulated by the operator, beneath this table surface. According to another feature of the invention, the high-voltage parts of the microscope are enclosed in a grounded tank which is also mounted on the aforementioned hollow supporting structure.

According to a further feature of the invention, means may be provided for preventing the vacuum pump from causing vibrations of the electronic microscope to this end, the pump, although arranged within the hollow supporting structure, is placed on a separate support independently arranged on the foundation.

The invention, in one of its further aspects, also provides a device which permits, after the disengagement of two parts of the electronic microscope, a rotation of a part in a direction perpendicular to the axis of the electronic microscope. This rotary device is secured to the hollow supporting structure. Such a device renders it easy to inspect the interior of the microscope. It is also thus possible by suitably selecting the point at which the electronic microscope is subdivided to remove certain individual parts of the microscope without interfering with the other parts of the microscope. In electronic microscopes whose individual parts are assembled with the aid of sealing cones, rubber rings or the like sealing means, the rotating device may be designed so as to also permit an axial displacement of the two parts of the electronic microscope to be brought out of engagement with each other.

Preferably, the rotary device is designed so as to cooperate with the upper part of the microscope. Consequently, when dissembling the microscope, the lower part remains firmly secured to the hollow supporting structure, whereas the upper part of the microscope, as described above moves first axially in the upward direction and is then rotated, thereby rendering the interior of the microscope accessible for inspection. The rotary device may be designed in various ways. A particularly simple arrangement is obtained, for instance, by providing the rotary device with a spindle drive to be adjusted by a hand wheel or the like and secured to the hollow supporting structure. With the aid of this spindle drive, the upper part of the microscope may be moved in the upward direction by means of a swivel arm, which may then be rotated by hand without employing special auxiliary means. The casing or tank protecting the high-voltage parts of the electronic microscope may be assembled with the rotary device so as to be firmly connected with the upper part of the microscope and to participate in the axial and rotary movements of this upper part. In this case it is preferable to apply the current supply conductor to such a point as to cause it to move as little as possible during the rotation described above. A particularly favorable attachment of the current supply conductors is obtained if the conductors at the point of attachment lie coaxially with respect to the axis of the swivel arm.

The above-mentioned and other objects and features of the invention will be fully understood from the following description of the embodiment exemplified in the accompanying drawing showing diagrammatically a vertical sectional view of a complete electronic microscope system according to the invention.

Referring to the drawing, 1 denotes the radiating apparatus of the microscope, i. e. the source of the electron beam. 2 is the condenser coil. The electron beam emitted from source 1 and condensed by coil 2 passes through the microscope portion that encloses the object to be magnified, through the objective lens 4, a microscope portion 5 provided with inspection windows for observing the intermediate image, and then through the projection lens 6 to the lower part 7 of the microscope vessel, this part having the main inspection windows and containing the fluorescent screen or the photographic plate on which the magnified image of the object is to be produced.

The electronic microscope is mounted on a hollow supporting structure forming an enclosure or cabinet for the auxiliary devices required for operating the microscope proper. The hollow supporting structure is composed of two main parts 8 and 9. These two parts are firmly held together by screws 10. The part 9 has a table-like top surface on which the lower part 7 of the electronic microscope is mounted. 11 denotes a grounded tank enclosing the high-voltage parts of the electronic microscope. In this tank is arranged the battery casing 12 to which the current supply conductors 13 are connected. The conductor 14 leads from the battery casing 12 to the electron emitting source 1. The battery casing is secured to an insulating body 15 attached to a holder 16 by means of screws 17. The holder 16 has a tubular neck portion 60 which is axially displaceable in a stationary guide 61. A bolt 62 arranged in the stationary guide 61 and engaging a longitudinal groove 63 of the neck portion 60 prevents a rotation of the neck portion unless it is first displaced upwardly so that the bolt 62 enters into a circumferential groove communicating with the longitudinal groove 63. A spindle 64 is disposed in the neck portion 60 so as to be revolvable relatively thereto. A swivel arm 18 has its hub portion provided with an internal thread which engages a corresponding thread 19 of spindle 64. The spindle carries a worm gear 25, meshing with a worm 26 which is connected with a hand wheel 27 arranged exteriorly of the supporting structure of the microscope. The spindle bears through a ball collar bearing 24 against a stationary support 28. A plate 20 firmly secured to the swivel arm 18 so as to form an integral part thereof is provided at its outer end with a bore in which fits the part 5 of the electronic microscope.

As apparent from the drawing, the upper part of the microscope and the top portion 5 of the lower microscope section are connected by means of vacuum-tight sealing cones 22 and 23 which may be brought out of engagement with each other. To facilitate the separation, a nut 21 is provided which when turned in the downward direction presses against the upper end of the sealing cone 22, thereby forcing the cones out of engagement.

The lifting and rotating device above described operates as follows. After the sealing cones 22 and 23 have been separated or loosened in the manner just mentioned, the hand wheel 27 is rotated, thereby revolving the spindle 64. The thread 19 of the spindle now moves the threaded swivel arm 18 upwardly together with the holder 16, the tank 11 and all parts secured thereto including the electron source 1, condensing coil 2, vessel portion 3 and objective coil 5. Thus the entire upper part of the electronic microscope is separated from the lower part in the axial direction. As soon as the upper part of the electronic microscope has been displaced in the axial direction to such an extent that the lower end of the cone 23 lies above the upper end of the cone 22, a further movement of the lifting device in the axial direction being prevented by a bolt 62 reaching the lower end of groove 63, the upper part of the electronic microscope may be rotated about spindle 64 away from its normal operating position. In the arrangement shown, the tank 11 and the high-voltage parts contained therein are axially displaced and rotated together with the upper part of the microscope so that an unobstructed inspection of the interior of the microscope is afforded.

The auxiliary devices of the microscope not arranged in the grounded container 11, are all disposed on or within the supporting structure, as will now be described in detail.

Near the upper end of the part 9 of the supporting structure in the immediate neighborhood of the observer is arranged a switch box 31 for the reception of the electric control devices required for the operation of the electronic microscope. The part 9 is provided with a foot 32 and the part 8 of the hollow body with two feet 33 (only one being visible in the drawing). The cabinet-like part 8 has a removable rear wall 51. A vacuum pump 35 is secured to a separate support 36 for preventing the transfer of vibrations from the pump to the microscope. Openings 38 and 39 of the support 36 and the rear wall 51 respectively permit the insertion and removal of a heater (Bunsen burner) for operating the pump 35. The waste gas of the burner leaves the heating chamber 52 through the passage 37. 40 designates a vacuum storage tank arranged in the upper part of the supporting structure. In the suction conduit 41 of the pump is arranged a cooling trap 42. 43 designates a tank containing the cooling agent for the cooling trap 42. The suction conduit communicates with the lower part 7 of the electronic microscope through the conduit connection 44. In order to enable an easy replacement of the cooling agent in the tank 43, the latter is placed on a plate 45 which may be moved in the upward and downward direction by means of a rack 46 and a pinion 47. 48 denotes a lateral opening provided in the wall of part 8 of the supporting structure. The cooling tank 43, inserted through opening 48, is raised by means of the hand wheel 49 operating the rack and pinion drive 46, 47 till the cooling trap 42 immerses in the cooling agent. 50 denotes a vacuum testing device connected to the suction conduit.

What is claimed is:

1. A microscopic apparatus, comprising an electron microscope having a vacuum vessel arranged vertically and subdivided horizontally to form two vessel portions separable from each other, a supporting structure having a lower portion forming a horizontal supporting surface and an upper portion extending upwardly from said surface, said microscope being arranged on said surface in front of said upper portion of said structure, the lower of said vessel portions being firmly mounted on said surface, holding means engaging said upper vessel portion and connected with said upper portion of said structure to support said upper vessel portion when the latter is separated from said lower vessel portion, said holding means being movably mounted on said upper portion of said structure to permit removing said upper vessel portion from said lower vessel portion.

2. A microscopic apparatus, comprising an electron microscope having a vacuum vessel arranged vertically and subdivided horizontally to form two vessel portions separable from each other, a supporting structure, one of said vessel portions being mounted on said structure, a holder connected with said structure and engaging said other vessel portion for supporting it when it is separated from said first vessel portion, a displacing mechanism mounted on said structure and interposed between said structure and said holder for moving said holder relative to said structure in order to separate said vessel portions from each other.

3. A microscopic apparatus, comprising a vertically arranged electron microscope having a vacuum vessel divided transversally with respect to the electron-optical axis and forming an upper and a lower vessel portion separable from each other, and vacuum-tight sealing means between said vessel portions, a supporting structure, said lower vessel portion being mounted on said supporting structure, a horizontally rotatable swivel arm engaging said upper vessel portion for supporting said upper vessel portion when the latter is separated from said lower vessel portion, and a lifting device disposed on said supporting structure for vertically displacing said swivel arm so as to separate and reengage respectively said vessel portions, said device having a vertically displaceable member and drive means for actuating said member, said arm being mounted on said member.

4. A microscopic apparatus, comprising a vertically arranged electron microscope having a vacuum vessel divided transversally with respect to the electron-optical axis and forming an upper and a lower vessel portion separable from each other, and vacuum-tight sealing means between said vessel portions, a supporting structure, said lower vessel portion being mounted on said supporting structure, a swivel arm structure engaging said upper vessel portion for supporting said latter portion, a lifting device for raising and lowering said swivel arm structure, said device comprising a vertical shaft disposed on said supporting structure, said swivel arm structure being arranged on said shaft and rotatable about the axis of said shaft to permit turning said upper vessel portion away from said lower portion, manual drive means disposed on said supporting structure and geared with said shaft for raising and lowering said shaft and said swivel arm structure, and stop means for preventing said swivel arm structure from being turned out of the operative position unless previously raised by said lifting device.

5. An electron microscopical apparatus, comprising a vertical microscope vessel having an upper and a lower portion saparable from each other and containing a high-voltage electron source arranged in said upper portion, a supporting structure, said lower vessel portion being mounted on said supporting structure, a supporting member for holding said upper vessel portion, said member engaging said upper vessel portion and being mounted on said supporting structure so as to be movable horizontally relative to said structure, high-voltage current supply means electrically connected with said electron source and arranged above said upper vessel portion, a protective cover surrounding said supply means, said cover and said supply means being mechanically connected with said holding member and said upper vessel portion so as to be horizontally movable together with said member and vessel portion.

6. An electron-microscopical apparatus, comprising a vertical microscope vessel having an upper and a lower vessel portion separable from each other and containing a high-voltage electron source arranged in said upper portion, a supporting structure forming a cabinet-like housing, said microscope vessel being arranged exteriorly of said housing and having said lower vessel portion fixedly mounted on said supporting structure, a supporting member for holding said upper vessel portion, said member engaging said upper vessel portion and being mounted on said supporting structure so as to be movable horizontally relative to said structure, high-voltage current supply means electrically connected with said electron source and arranged above said upper vessel portion, a protective cover surrounding said supply means, said cover and said supply means being mechanically connected with said holding member and said upper vessel portion to form a unit horizontally movable relative to said housing, pumping means for producing and maintaining a vacuum in said vessel, said pumping means being arranged within said housing formed by said supporting structure and operatively connected with said lower vessel portion.

ERNST RUSKA.
HANS SCHUCHMANN.
HELMUT RUSKA.
HEINZ O. MÜLLER.